United States Patent Office 3,222,329
Patented Dec. 7, 1965

3,222,329
TERPOLYMERS
Frederick Grosser, Midland Park, and Marvin R. Leibowitz, Nixon, N.J., and Andrew S. Wood, Calvert City, Ky., assignors to General Aniline & Film Corporation, New York, N.Y., a corporation of Delaware
No Drawing. Filed Feb. 21, 1961, Ser. No. 90,628
5 Claims. (Cl. 260—80.5)

This invention relates to the preparation of novel polymeric materials, and relates more particularly to the preparation of novel terpolymers by the polymerization of a monomeric mixture of three different monomers, which terpolymers have highly desirable characteristics.

Copolymers of N-vinyl pyrrolidone (hereinafter referred to as vinylpyrrolidone) with vinyl esters have been used as bases for coatings, hair sprays, textile sizes, adhesives, etc., but have some serious shortcomings. One of the greatest disadvantages of such copolymers is their high moisture pick-up, especially at high humidity. This is a very serious detriment in hair sprays, coatings, sizes, etc., since these copolymers pick up water and can cause hair to lose its shape and set and become soft and sticky, a filler to become limp and tacky, or a coating to become sticky and tacky. Another disadvantage of such copolymers is that they form relative hard and inflexible films resulting in sizings and coatings which become brittle and crack, and hair sprays which flake off and give a "dandruff-like" effect. Still another disadvantage of such copolymers is that they exhibit poor clarity under conditions of high humidity giving coatings and sizes of cloudy appearances and causing hair to lose its shine and lustre and become dull and drab.

An important object of this invention is to provide a terpolymer which will be free from the foregoing and other disadvantages.

Another object of this invention is the provision of terpolymers which have properties which are superior to present known polymeric substances.

Still another object of this invention is to provide improved polymeric materials which can be used as binders for electronic cores, coatings, textile sizes, paints, adhesives, hair sprays and similar uses.

A further object of this invention is to provide an improved process for the preparation of the terpolymers of the instant invention.

Other objects and advantages of this invention will appear from the following detailed description.

It has been descovered that terpolymers produced from monomers of (a) vinyl pyrrolidone, (b) vinyl stearate and (c) vinyl acetate or acrylate esters such as methyl, ethyl, and butyl acrylates, possess qualities superior to those possessed by the aforementioned vinyl pyrrolidone-vinyl ester copolymers when used in coatings, textile sizes, paints, adhesives, hair sprays and related fields.

The terpolymers of the instant invention may be prepared by solution, emulsion or suspension polymerization techniques, using peroxy or azo type catalysts. In water systems, in addition to the peroxy or azo type catalysts, redox catalysts may also be used.

In accordance with this invention, the preferred method of polymerization is the solvent type polymerization wherein the terpolymer remains soluble. Examples of solvents which may be employed in this method are alcohols such as ethyl alcohol, pyrrolidone, methyl carbitol and dimethyl formamide. However, ethyl alcohol is the preferred solvent since it is the solvent commercially most acceptable.

Examples of peroxy catalysts which may be employed are hydrogen peroxide, benzoyl peroxide and lauroyl peroxide. By an azo type catalyst is meant a compound containing the azo linkage —N=N—, such as, for example, azobisiobutyronitrile. The azo type catalysts are preferred for preparing the terpolymers of the instant invention. In water systems, however, a redox catalyst such as, for example, ammonium persulfate and sodium bisulfite, may be used.

In obtaining the desired properties of the terpolymers of the present invention, the following ratios (by weight) of monomers in said terpolymers are preferred:

| | Parts |
|---|---|
| Vinyl pyrrolidone | 40–90 |
| Vinyl stearate | 2–20 |
| Vinyl acetate or Acrylate ester | 8–58 |

If either more or less of the above ratios are used, the desired properties of the terpolymers of this invention may not be obtained. Specifically, homogeneous terpolymers are not obtained.

The following examples serve to illustrate how the present invention may be carried out in practice, but the invention is not restricted to the said examples.

*Example 1*

110 grams of absolute ethanol, 64 grams of vinyl pyrrolidone, 16 grams of vinyl stearate and 64 grams of vinyl acetate were placed in a flask. The mixture was flushed with nitrogen and heated to 65° C. The mixture was then charged with .18 gram of azo iso butyronitrile and heated to reflux (approximately 76° C.). The reflux was maintained for two hours. Thereafter, the mixture was charged with 10 grams vinyl pyrrolidone and .12 gram of azo iso butyronitrile were added to the mixture. After an additional eight hours of reflux, .12 gram of azo iso butyronitrile was again added. The reflux was continued an additional 10¾ hours. The heat was then turned off and the mixture was charged with 50 grams of absolute ethanol. The solution was then cooled and discharged. Final analysis was as follows:

Percent residual monomer=less than 1.0%
Percent solids=50.4
K value (absolute ethanol)=33.3 (molecular weight=approximately 70,000)

*Example 2*

2640 grams of absolute ethanol, 1535 grams of vinyl pyrrolidone, 384 grams of vinyl stearate, and 1152 grams of ethyl acrylate were charged to a flask. The mixture was flushed with nitrogen and heated to 65° C. The mixture was then charged with 4.32 grams azo iso butyronitrile and heated to reflux temperature (approximately 80° C.). The reflux was maintained for two hours and then the mixture was charged with 240 grams of vinyl pyrrolidone, 240 grams of ethyl acrylate and 2.88 grams of azo iso butyronitrile.

After continuing the reflux for an additional 4 hours, the mixture was further charged with 144 grams of vinyl pyrrolidone, 144 grams of ethyl acrylate and 2.88 grams of azo iso butyronitrile. The reflux was maintained another 6 hours and an additional 2.88 grams of the azo catalyst was added. The reflux was continued an additional 8 hours and 2.88 grams of the azo catalyst was again charged to the mixture. Refluxing continued for 10 more hours. The heat was then removed and the mixture was charged with 1330 grams of absolute ehtanol. The solution was then cooled and discharged. Final analysis was as follows:

Percent residual monomer=less than .35%
Percent solids=50.4
K value (absolute ethanol)=35.0 (molecular weight=approximately 75,000)

Example 3

The process as set forth in Example 2 was followed except methyl acrylate was substituted for the ethyl acrylate.

Example 4

The process as set forth in Example 2 was followed substituting butyl acrylate for the ethyl acrylate.

Example 5

In order to determine moisture pick-up of dried films of the above polymeric substances the following procedure was used:

Petri dishes were tared on an analytical balance. A small amount of the polymeric solution to be tested was poured over the bottom of the tared dish and allowed to dry to constant weight in a vacuum oven at 60° C. The dried film was then placed in a humidity chamber which was maintained at 80% relative humidity. The film was left exposed to this humidity and weighted at various intervals until constant weight was obtained. When constant weight was obtained, this was considered maximum moisture pick-up for the film at 80% relative humidity and the percent moisture pick-up was determined by the following formula:

$$\frac{\text{Increase in weight of film after humidity exposure}}{\text{Weight of film before humidity exposure}} \times 100 = \text{percent mosture pick-up}$$

The following table illustrates the superiority of the terpolymers of the present invention over a copolymer of vinyl pyrrolidone and vinyl acetate and a copolymer of vinyl pyrrolidone and vinyl stearate, which have shortcomings in their application as set forth above. (All polymers were 50% solutions in anhydrous ethanol.)

Sample: Percent moisture pick-up
(1) Copolymer of vinyl pyrrolidone and vinyl acetate _____ 16.1
(2) Copolymer of vinyl pyrrolidone and vinyl stearate _____ 26.1
(3) Terpolymer of vinyl pyrrolidone and vinyl stearate with vinyl acetate (Example 1) ____ 12.3
(4) Terpolymer of vinyl pyrrolidone and vinyl stearate with ethyl acrylate (Example 2) ____ 9.7
(5) Terpolymer of vinyl pyrrolidone and vinyl stearate with methyl acrylate (Example 3) __ 9
(6) Terpolymer of vinyl pyrrolidone and vinyl stearate with butyl acrylate (Example 4) __ 7

As is evident from the above table, the terpolymers of this invention, because of their lower moisture pick-up, are more suitable when used as a base for adhesives, coatings, sizes and hair sprays than the copolymers of Samples 1 and 2.

Example 6

Hardness or brittleness of the polymer film was determined by the following procedure:

Films were applied to a glass plate 4" x 6", by means of a Bird Applicator with an opening of 0.003 inch. The films were drawn down by hand, depositing a dry film 0.0015 inch thick.

The films were allowed to air dry for 24 hours and were then tested for hardness by means of a set of pencils of varying hardness. The hardness of each film was determined by trying to scratch the surface of the film with a pencil of increasing hardness, until a scratch in the film was made. The softer, more flexible the polymeric film is, the more continuous it is and would therefore make a better coating, adhesive, size, hair spray etc.

The following results were obtained:

Sample: Hardness
(1) Vinyl pyrrolidone-vinyl acetate copolymer _____ 4H
(2) Vinyl pyrrolidone-vinyl stearate copolymer _____ 4H
(3) Vinyl pyrrolidone-vinyl stearate-vinyl acetate terpolymer _____ H
(4) Vinyl pyrrolidone-vinyl stearate-ethyl acrylate terpolymer _____ HB
(5) Vinyl pyrrolidone-vinyl stearate-methyl acrylate terpolymer _____ H
(6) Vinyl pyrrolidone-vinyl stearate-butyl acrylate terpolymer _____ HB Pencil hardness increases with higher H number, HB being softest and 4H being hardest.

Example 7

The following procedure was used in order to determine film continuity and clarity at high humidities:

Films were cast on a glass plate 3" x 4" by means of a Bird applicator with an opening of 0.003 inch. The films were drawn down by hand, depositing a film 0.0015 inch thick. The films were allowed to air dry 24 hours and then placed in a chamber maintained at 100% relative humidity. After 24 hours at 100% relative humidity the films were examined for clarity and continuity. Clarity was determined by observation and continuity determined by placing the forefinger over the film and running the finger over the film to determine if any breaks or discontinuity existed.

The following results were obtained:

| Sample | Clarity | Continuity |
| --- | --- | --- |
| (1) Vinyl pyrrolidone-vinyl acetate copolymer. | Hazy | Non-continuous soupy. |
| (2) Vinyl pyrrolidone-vinyl stearate copolymer. | Clear | Continuous. |
| (3) Vinyl pyrrolidone-vinyl stearate-vinyl acetate terpolymer. | ___do___ | Do. |
| (4) Vinyl pyrrolidone-vinyl stearate-ethyl acrylate terpolymer. | ___do___ | Do. |
| (5) Vinyl pyrrolidone-vinyl stearate-methyl acrylate terpolymer. | ___do___ | Do. |
| (6) Vinyl pyrrolidone-vinyl stearate-butyl acrylate terpolymer. | ___do___ | Do. |

While the vinyl pyrrolidone/vinyl stearate copolymer (Sample #2) appeared to be equivalent to the terpolymers, the terpolymers were far superior to the vinyl pyrrolidone/vinyl acetate coplymer in continuity of film and clarity at high humidity. Because of this good film continuity the terpolymers are much more suitable as adhesive, since they would not delaminate at high humidities. They also make better hair sprays since they would not become dull and soupy and cause the hair to lose its set. They obviously would also make better coatings and sizes since they would not turn cloudy and soupy, which would cause the coating or size to run and become limp.

Example 8

Another very importatnt property of coatings, sizes, hair sprays, etc. is the gloss of their films. The glossier the film the better appearing coating and size it makes and the superior hair spray produced. Gloss gives a good shine and appearance to the hair, rather than a dull, drab look. Gloss was tested in the following manner:

Films are spread on a piece of glass 4" x 6" by means of a Bird Applicator with an opening of 0.003 inch. The films were applied by hand and dried to a thickness of 0.0015 inch. These films were allowed to air dry for 24 hours and then tested on a Gardner Glossometer with a 60° head. The Glossometer is first calibrated with a black plate and white plate and then the film to be tested is inserted. Gloss is then read from the scale multiplied by the appropriate calibration. The higher the reading, the glossier the film.

The following results were obtained:

| Sample: | Gloss |
|---|---|
| (1) Vinyl pyrrolidone-vinyl acetate copolymer | 126 |
| (2) Vinyl pyrolidone-vinyl stearate copolymer | 112 |
| (3) Vinyl pyrrolidone-vinyl stearate-vinyl acetate terpolymer | 128 |
| (4) Vinyl pyrrolidone-vinyl stearate-ethyl acrylate terpolymer | 140 |
| (5) Vinyl pyrrolidone-vinyl stearate-methyl acrylate terpolymer | 140 |
| (6) Vinyl pyrrolidone-vinyl stearate-butyl acrylate terpolymer | 140 |

The terpolymers were obviously superior in this respect.

The aforemetnioned tables show the superiority of the terpolymers of this invention in such fields as coatings, adhesives, sizes and hair sprays.

The terpolymers of the instant invention were also tested as binders for electronic cores in the following manner:

Iron powder, made from iron carbonyl, was blended with the terpolymer and put into a hydraulic press. Under presure a pressed core was formed using the terpolymer as a binder. This core was then tested in a Q meter (which measures the ratio of the resistance of the active component to the inactive component) and showed to be satisfactory for use as an electronic core.

While various embodiments of the invention have been described in detail, it is to be understood that the same is not limited thereto, but that further modifications are possible without departing from the spirit of the invention.

What is desired to be secured by Letters Patent is:

1. A film forming thermoplastic randomly distributed terpolymer consisting of 40 to 90 parts by weight of N-vinylpyrrolidone, 2 to 20 parts by weight of vinyl stearate and 8 to 58 parts by weight of a third component selected from the group consisting of vinyl acetate, ethyl acrylate, methyl acrylate and butyl acrylate.

2. A terpolymer according to claim 1 wherein the third component is vinyl acetate.

3. A terpolymer according to claim 1 wherein the third component is ethyl acrylate.

4. A terpolymer according to claim 1 wherein the third component is methyl acrylate.

5. A terpolymer according to claim 1 wherein the third component is butyl acrylate.

References Cited by the Examiner

UNITED STATES PATENTS

| 2,497,705 | 2/1950 | Werntz | 260—88.3 |
| 2,667,473 | 1/1954 | Morner | 260—85.7 |
| 2,941,980 | 6/1960 | Robinson | 260—85.7 |

JOSEPH L. SCHOFER, *Primary Examiner.*

PHILIP E. MANGAN, LEON J. BERCOVITZ, *Examiners.*